(12) United States Patent
Ahn et al.

(10) Patent No.: US 9,916,055 B2
(45) Date of Patent: Mar. 13, 2018

(54) MULTI-CHIP TOUCH SYSTEM AND CONTROL METHOD THEREFOR

(71) Applicant: SILICON WORKS CO., LTD., Daejeon (KR)

(72) Inventors: Yong Sung Ahn, Seoul (KR); Jung Min Choi, Daejeon (KR)

(73) Assignee: Silicon Works Co., Ltd., Daejeon (KR)

( * ) Notice: Subject to any disclaimer, the term of this patent is extended or adjusted under 35 U.S.C. 154(b) by 150 days.

(21) Appl. No.: 15/096,858

(22) Filed: Apr. 12, 2016

(65) Prior Publication Data

US 2016/0306465 A1     Oct. 20, 2016

(30) Foreign Application Priority Data

Apr. 17, 2015    (KR) .......................... 10-2015-0054195

(51) Int. Cl.
*G06F 3/044*     (2006.01)
*G06F 3/041*     (2006.01)

(52) U.S. Cl.
CPC ............ *G06F 3/044* (2013.01); *G06F 3/0416* (2013.01)

(58) Field of Classification Search
CPC ................................ G06F 3/044; G06F 3/0416
See application file for complete search history.

(56) References Cited

U.S. PATENT DOCUMENTS

| 6,850,218 | B2* | 2/2005 | Waterman | ............ | G09G 3/3648 |
| | | | | | 345/103 |
| 7,202,858 | B2* | 4/2007 | DeGroot | ............... | G06F 3/0418 |
| | | | | | 178/18.01 |
| 8,860,686 | B2 | 10/2014 | Simmons et al. | | |
| 8,969,774 | B2* | 3/2015 | Johansson | ............... | H04N 5/378 |
| | | | | | 250/208.1 |
| 2013/0278525 | A1* | 10/2013 | Lim | ...................... | G06F 3/0416 |
| | | | | | 345/173 |
| 2014/0253536 | A1* | 9/2014 | Honda | ................. | G09G 3/3696 |
| | | | | | 345/213 |
| 2014/0267158 | A1* | 9/2014 | Bertrand | ................. | G06F 3/044 |
| | | | | | 345/174 |

FOREIGN PATENT DOCUMENTS

| KR | 10-2015-0026001 A | 3/2015 |
| KR | 10-2015-0080245 A | 7/2015 |

* cited by examiner

*Primary Examiner* — Andrew Sasinowski
(74) *Attorney, Agent, or Firm* — Fenwick & West LLP

(57) ABSTRACT

The present disclosure provides a technology related to a multi-chip touch system. In the multi-chip system, in a case in which two touch ICs share one receiving electrode and an even number of receiving electrodes are connected to one touch IC, when another touch IC senses the shared receiving electrode, the one touch IC does not connect another receiving electrode, which that is disposed at the outermost portion, as well as the shared receiving electrode.

15 Claims, 7 Drawing Sheets

MULTI-CHIP TOUCH SYSTEM AND CONTROL METHOD THEREFOR

CROSS-REFERENCE TO RELATED APPLICATION

This application claims priority from and the benefit under 35 U.S.C. § 119(a) of Korean Patent Application No. 10-2015-0054195, filed on Apr. 17, 2015, which is hereby incorporated by reference for all purposes as if fully set forth herein.

BACKGROUND

1. Field of Technology

The present disclosure relates to a technology for recognizing a touch on a touch panel using a plurality of touch Integrated Circuits (ICs).

2. Description of the Prior Art

A touch recognizing technology is a technology for recognizing an input operation of a user by sensing a signal that is generated when an object is close to, or contacts, a touch panel including a sensor. In the touch recognizing technology, various types such as a magnetic method, a resistive method, and a capacitive method are used, and recently, the capacitive method has become the general trend.

A plurality of sensors are disposed in a touch panel. The wider a touch area of the touch panel or the higher touch resolution, more sensors are disposed in the touch panel. Recently, the number of sensors disposed in the touch panel is being increased. Accordingly, the area of the touch panel is getting larger and the resolution of the touch panel is getting higher simultaneously.

When the number of the sensors disposed in the touch panel is increased, a sensing signal may be distributed to process the sensing signal using a plurality of touch Integrated Circuits (ICs), rather than processing all sensing signals using one touch IC. A system in which the sensing signal is distributed and processed using the plurality of touch ICs as described above is referred to as a multi-chip touch system.

Meanwhile, the multi-chip touch system may process the sensing signal in a differential method. When the differential method is applied to the multi-chip touch system, a signal process in the plurality of touch ICs may cause a problem. For example, in the case of the differential method, two touch ICs are connected together to a receiving electrode that is positioned in a boundary area. At this time, a method in which two touch ICs sense the boundary area receiving electrode without a mutual interference may cause a problem.

Meanwhile, in U.S. Pat. No. 8,860,868, a technology for sensing a touch using a plurality of touch ICs is disclosed. However, a signal process technology in the differential method is not disclosed in U.S. Pat. No. 8,860,868.

SUMMARY

In such a background, an aspect of the present disclosure is to provide a signal process technology in a plurality of touch ICs in a multi-chip touch system sensing in a differential method.

In order to achieve the above-mentioned objects, the present disclosure provides a touch system for sensing proximity or a touch of an object for a touch panel in which a plurality of areas is divided. The touch system comprises: a first touch IC configured to generate touch data for a first area from a sensing signal received from first receiving electrodes and a boundary receiving electrode; and a second touch IC configured to generate touch data for a second area from a sensing signal received from second receiving electrodes and the boundary receiving electrode. When the first touch IC receives the sensing signal from the boundary receiving electrode, the second touch IC releases a connection with at least one receiving electrode among the second receiving electrodes and releases the connection with the boundary receiving electrode.

As described above, according to the present disclosure, a plurality of touch ICs may perform an optimal signal process in a multi-chip touch system sensing in a differential method.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
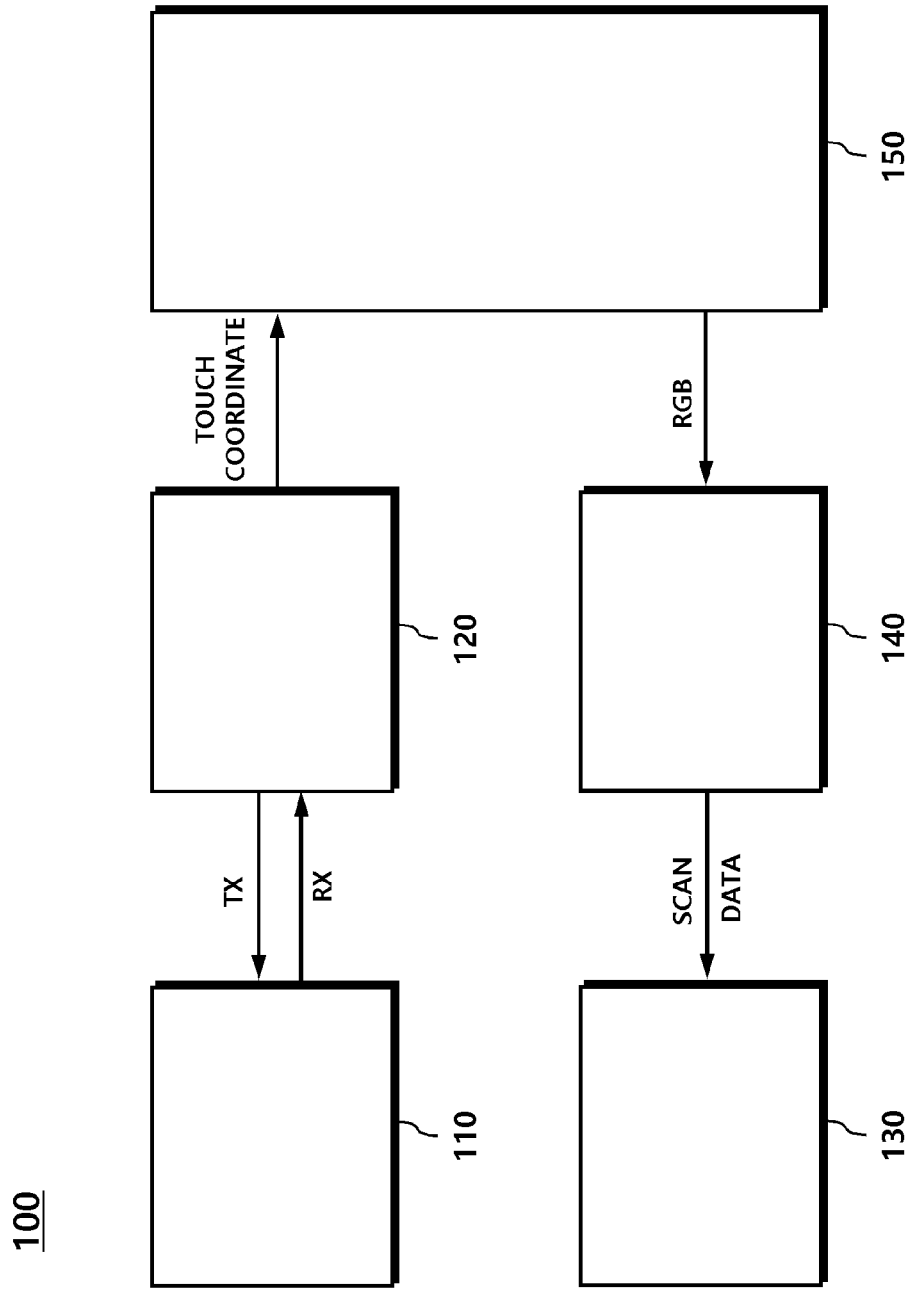
FIG. 1 is a configuration diagram of a display apparatus according to an embodiment of the present disclosure.

Hereinafter, some embodiments of the present disclosure will be described in detail with reference to the accompanying drawings. In the following description, the same components will be designated by the same reference numerals although they are shown in different drawings. Further, in the following description, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a configuration diagram of a display apparatus according to an embodiment of the present disclosure.

Referring to FIG. 1, the display apparatus 100 may include a display panel 130 and a touch panel 110. The display apparatus 100 may include a driver device 140 for driving the display panel 130, and a touch recognizing device 120 for driving and sensing the touch panel 110. In addition, the display apparatus 100 may include a host 150 which may transmit and receive information to and from the driver device 140 and the touch recognizing device 120.

In the embodiment described with reference to FIG. 1, the display panel 130 and the touch panel 110 are separated, but the present disclosure is not limited to the embodiment. The display panel 130 and the touch panel 110 may have an integral type in which the display panel 130 and the touch panel 110 share some electrodes. For example, the display apparatus 100 may include an in-cell type panel (not shown). The in-cell type panel (not shown) has an integral panel type in which a common electrode is used as a display electrode and is used as a touch electrode. In the embodiment below, for the convenience of description, the display apparatus 100 includes each of the display panel 130 and the touch panel 110, but the present disclosure is not limited thereto.

In the embodiment described with reference to FIG. 1, the driver device 140 and the touch recognizing device 120 are separated, but the present disclosure is not limited thereto. The driver device 140 and the touch recognizing device 120 may be combined in one Integrated Circuit (IC) device. Specifically, when the display apparatus 100 includes an integral panel, a type in which the driver device 140 and the touch recognizing device 120 are combined may have advantages. For example, in the in-cell type panel (not shown), a common electrode is used as the display electrode and is used as the touch electrode. At this time, when the driver device 140 and the touch recognizing device 120 are combined, the common electrode may be driven as the display electrode and may be used as the touch electrode using one driving circuit. In the embodiment below, for the convenience of description, the display apparatus 100 includes each of the driver device 140 and the touch recognizing device 120, but the present disclosure is not limited thereto as described above.

The display panel 130 may be implemented based on a flat display device, such as a Liquid Crystal Display (LCD), a Field Emission Display (FED), a Plasma Display Panel (PDP), an Organic Light Emitting Display (OLED), and an Electrophoresis display (EPD). In an embodiment wherein the display panel 130 is an LCD, the display panel 130 may include a liquid crystal layer between two substrates. In such an embodiment, a lower substrate of the display panel 130 may include a plurality of data lines, a plurality of gate lines crossing the data lines, a plurality of Thin Film Transistors (TFTs) formed in a crossing areas of the data lines and the gate lines, a plurality of display electrodes for charging a data voltage in liquid crystal cells, a storage capacitor that is connected to the display electrode to maintain the voltage of the liquid crystal cell, and the like. In such an embodiment, an upper substrate of the display panel 130 may include a black matrix, a color filter, a polarizing plate, and the like.

The driver device 140 may convert digital video data RGB input from the host 150 or a timing controller (not shown) into an analog positive polarity/negative polarity gamma compensation voltage, to output a data voltage DATA. The data voltage may be provided to the data lines. Also, the driver device 140 may sequentially provide a gate pulse SCAN to the gate lines to select a line of the display panel 130 to which the data voltage is written.

The display panel 130 and the driver device 140 are elements related to displaying an image on a screen. Continuously, a configuration related to recognizing a touch in the display apparatus 100 is described with reference to FIG. 1.

The display apparatus 100 may include the touch panel 110 and the touch recognizing device 120 for recognizing a touch as a user operation.

The touch panel 110 may be attached to an upper polarizing plate of the display panel 130 or may be formed between the upper polarizing plate and the upper substrate. In addition, when the touch panel 110 is formed in an in-cell type, the touch panel 110 may be formed in the lower substrate together with a pixel array in the display panel 130.

The touch panel 110 may include driving electrodes, receiving electrodes and sensors. As an example, the driving electrodes and the receiving electrodes may be positioned in different layers and may cross each other-cross structure. In such a cross structure, the sensors may be capacitors formed in a crossing area of the driving electrodes and the receiving electrodes. As another example, the driving electrodes and the receiving electrodes may be the same layer-1-layer structure. In such a 1-layer structure, the sensors may be capacitors horizontally formed between the driving electrodes and the receiving electrodes. As another further example, the driving electrode may be the receiving electrode-self structure. In such a self structure, the sensors may be capacitors formed between the receiving electrodes and peripheral electrodes. Such a position relation of the driving electrodes and the receiving electrodes in the touch panel 110 is just an example, the driving electrodes and the receiving electrodes may form a position relation that is different from such examples. All examples of a structure in which a capacitor is formed between the receiving electrodes and the peripheral electrodes or between the receiving electrodes as the sensor, and a capacitance of the capacitor is changed by an object accessed or contacted to the touch panel 110, may be employed to the touch panel 110 according to the embodiment of the present invention.

Here, the sensors may be referral to as touch sensors since the sensors sense the object that is close to, or contacts, the touch panel 110, but the present disclosure is not limited to such a term. Below, the sensor may be interpreted as meaning the same as the touch sensor if another modification is not added.

The touch recognizing device 120 may provide a driving signal TX to the driving electrodes, may generate a touch coordinate by sensing a sensing signal RX of the sensor through the receiving electrodes, and may transmit such touch coordinate data to the host 150.

The touch recognizing device 120 may include two or more touch ICs, and may distribute and process a sensing signal using two or more touch ICs.

Since the touch recognizing device 120 uses two or more touch ICs, the touch recognizing device 120 may be referred to as a system or a touch system. Below, to increase the understanding of the disclosure, the touch recognizing device 120 is referred to as a touch system. But, the present invention is not limited to such a term.

Figure 2:
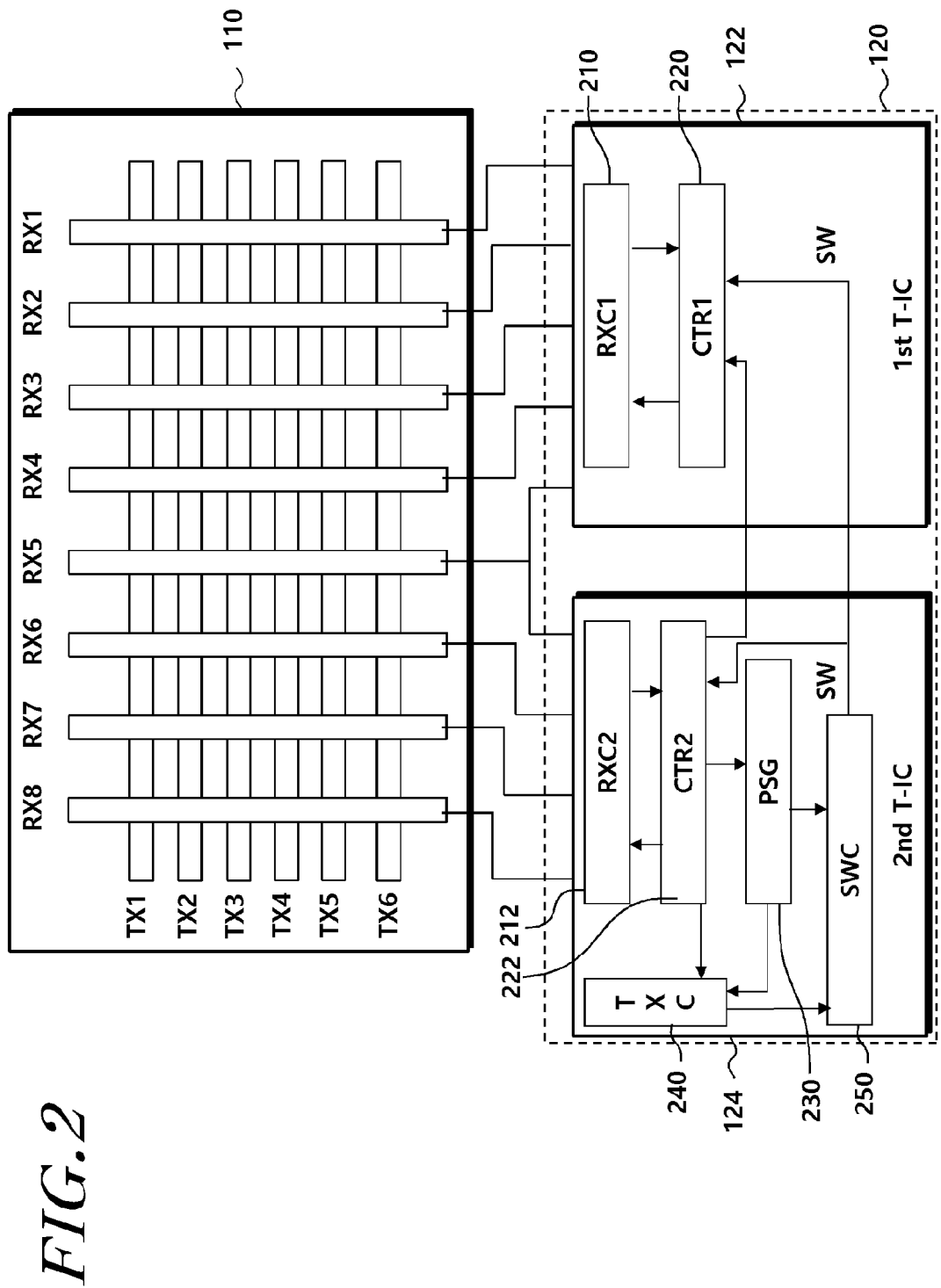
FIG. 2 is a view for describing a configuration of a touch system according to an embodiment of the present disclosure.

FIG. 2 is a view for describing a configuration of a touch system according to an embodiment of the present disclosure.

The touch system 120 may include a first touch IC 122 and a second touch IC 124 as shown in FIG. 2.

Referring to FIG. 2, the first touch IC 122 and the second touch IC 124 may include sensing circuit units 210 and 212 that process a sensing signal by receiving the sensing signal from receiving electrodes connected to the first touch IC 122 and the second touch IC 124. In addition, the first touch IC 122 and the second touch IC 124 may include control units 220 and 222, which generate touch data and manage overall controls. Below, for the convenience of description, the sensing circuit unit included in the first touch IC 122 is referral to as a first sensing circuit unit 210, and the sensing circuit unit included in the second touch IC 124 is referral to as a second sensing circuit unit 212. In addition, the control unit included in the first touch IC 122 is referred to as a first control unit 220, and the control unit included in the second touch IC 124 is referred to as a second control unit 222. But, the first sensing circuit unit 210 and the second sensing circuit unit 212 may have substantially the same or a similar circuit configuration, and the first control unit 220 and the second control unit 222 may have substantially the same or a similar circuit configuration. Therefore, it should be understood that embodiments described by separating the first sensing circuit unit 210 and the second sensing circuit 212, and the first control unit 220 and the second control unit 222, may be employed to a different configuration.

Referring to FIG. 2, the second touch IC 124 may further include a pulse generating unit 230, a driving circuit unit 240, and a switching signal unit 250. The pulse generating unit 230, the driving circuit unit 240, and the switching signal unit 250 may not be included in the second touch IC 124, and may be included in the first touch IC 122 in other embodiments. In the below, an embodiment in which the pulse generating unit 230, the driving circuit unit 240, and the switching signal unit 250 are included in the second touch IC 124 is described.

The driving circuit unit 240 sequentially provides the driving signal to the driving electrodes TX1 to TX6. For example, the driving circuit unit 240 may sequentially provide the driving signal to all driving electrodes TX1 to TX6 according to such a sequence in which the driving circuit unit 240 provides the driving signal to the first driving electrode TX1. Next, the driving circuit unit 240 provides the driving signal to the second driving electrode TX2. Then, the driving circuit unit 240 provides the driving signal to the third driving electrode TX3, etc.

Meanwhile, the driving circuit unit 240 may simultaneously provide the driving signal to two or more driving electrodes among the driving electrodes TX1 to TX6. At this time, different types of driving signals may be provided to the driving electrodes to which the driving signal is provided simultaneously. For example, driving signals of which frequencies are different may be provided to each driving electrode, and driving signals of which codes are different may be provided to each driving electrode.

Below, an embodiment is described in which the driving circuit unit 240 sequentially provides the driving signal to the driving electrodes TX1 to TX6, but present disclosure is not limited thereto. As described above, the driving circuit unit 240 may simultaneously provide the driving signal to two or more driving electrodes using a multiplexing method (e.g., a Frequency Division Multiplexing (FDM), a Code Division Multiplexing (CDM), and the like).

A driving signal output of the driving circuit unit 240 may be controlled by the second control unit 222, and may be controlled by a pulse provided from the pulse generating unit 230.

The pulse generating unit 230 may generate the pulse by a clock (refer to a reference number CLK of FIG. 5) provided from the second control unit 222, and may transfer the pulse to the driving circuit unit 240. In addition, the driving circuit unit 240 may generate the driving signal using the pulse.

When the driving circuit unit 240 provides the driving signal to the driving electrodes TX1 to TX6, the sensing signal corresponding to the driving signal may be generated in the receiving electrodes RX1 to RX8. The first sensing circuit unit 210 and the second sensing circuit unit 212 receive the sensing signal from the receiving electrodes RX1 to RX8.

When the touch panel 110 is a capacitive touch panel, the touch panel may include the plurality of driving electrodes TX1 to TX6 and the plurality of receiving electrodes RX1 to RX8, as shown in FIG. 2. The sensors may be formed by the crossing of the driving electrodes TX1 to TX6 and the receiving electrodes RX1 to RX8.

The capacitances of the sensors may be changed by the proximity or the touch of the object. The first sensing circuit unit 210 and the second sensing circuit unit 212 may sense the capacitance change of the sensors through the sensing signal received from the receiving electrodes RX1 to RX8. For example, when the driving signal is provided to the sensor, the capacitance of the sensor may be changed according to whether the object touches the touch panel 110, and thus a voltage of a receiving electrode connected to a corresponding sensor may be changed. The first sensing circuit unit 210 and the second sensing circuit unit 212 may sense the capacitance change of the sensor connected to a corresponding receiving electrode by receiving the voltage of the receiving electrode as the sensing signal.

The first sensing circuit unit 210 and the second sensing circuit unit 212 may sense the capacitance change of the sensors, may convert the capacitance change to a digital value, and may transfer the digital value to each of the first control unit 220 and the second control unit 222.

In addition, the first control unit 220 and the second control unit 222 may generate the touch data using the digital value.

Referring to FIG. 2, the first touch IC 122 is connected to the first receiving electrode RX1 to the fifth receiving electrode RX5. When an area from the first receiving electrode RX1 to the fifth receiving electrode RX5 is a first area, the first touch IC 122 may generate touch data for the first area. In addition, the second touch IC 124 is connected to the fifth receiving electrode RX5 to the eighth receiving electrode RX8. When an area from the fifth receiving electrode RX5 to the eighth receiving electrode RX8 is a second area, the second touch IC 124 may generate touch data for the second area.

The touch system 120 senses the proximity or the touch of the object on the touch panel 110, which is divided into a plurality of areas. In the embodiment of FIG. 2, the touch panel 110 is divided into two areas, the first touch IC 122 generates the touch data for the first area, and the second touch IC 124 generates the touch data for the second area.

In order to sense a touch with respect to a whole of the touch panel 110, the touch data generated from each of the touch ICs 122 and 124 are required to be combined. To this end, the touch system 120 may further include a third touch IC (not shown). At this time, the first touch IC 122 and the second touch IC 124 may transmit the touch data generated each of the first touch IC 122 and the second touch IC 124 to the third touch IC (not shown). The third touch IC (not shown) may combine the touch data received from each of the first touch IC 122 and the second touch IC 124 to sense the touch for the whole of the touch panel 110. In addition, the third touch IC (not shown) may transmit final result data (e.g., touch coordinate information, touch coordinate tracking information, and the like) to the host 150.

Meanwhile, the first touch IC 122 may receive the touch data for the second area from the second touch IC 124, and may combine the touch data for the second area with the touch data for the first area to generate the final result data. In this case, the touch system 120 does not separately further include another touch IC (e.g., the third touch IC), and may sense the touch for the whole of the touch panel 110. At this time, the first touch IC 122 transmits the final result data to the host 150.

On the contrary, the second touch IC 124 may receive the touch data for the first area from the first touch IC 122, and may combine the touch data for the first area with the touch data for the second area to generate the final result data.

Meanwhile, the first sensing circuit unit 210 and the second sensing circuit unit 212 may be connected to the receiving electrodes RX1 to RX8 through switches. The switches may be turned on or off according to a switching control signal SW of the switching signal unit 250. For example, the switching signal unit 250 may provide the switching control signal SW to the first control unit 220 and the second control unit 222, and the first control unit 220 and the second control unit 222 may control to turn on or off the switches positioned in the first sensing circuit unit 210 and the second sensing circuit unit 212 according to the switching control signal.

The control for the switches is further described using internal configurations and operation timings of the first sensing circuit unit 210 and the second sensing circuit unit 212.

Figure 3:
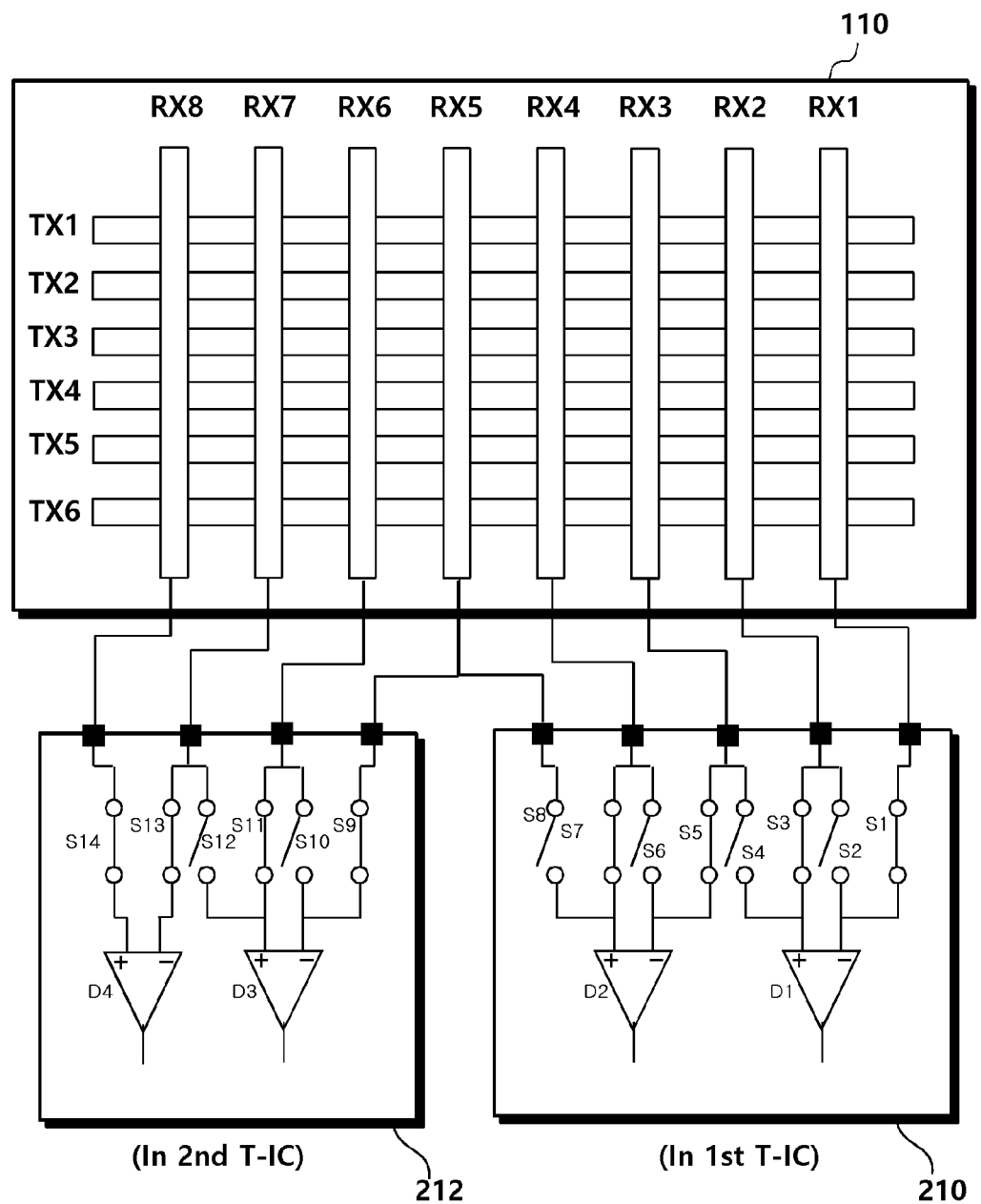
FIGS. 3 and 4 are views for describing a first example for an internal configuration of a sensing circuit unit of FIG. 2 according to an embodiment of the present disclosure.
Figure 4:
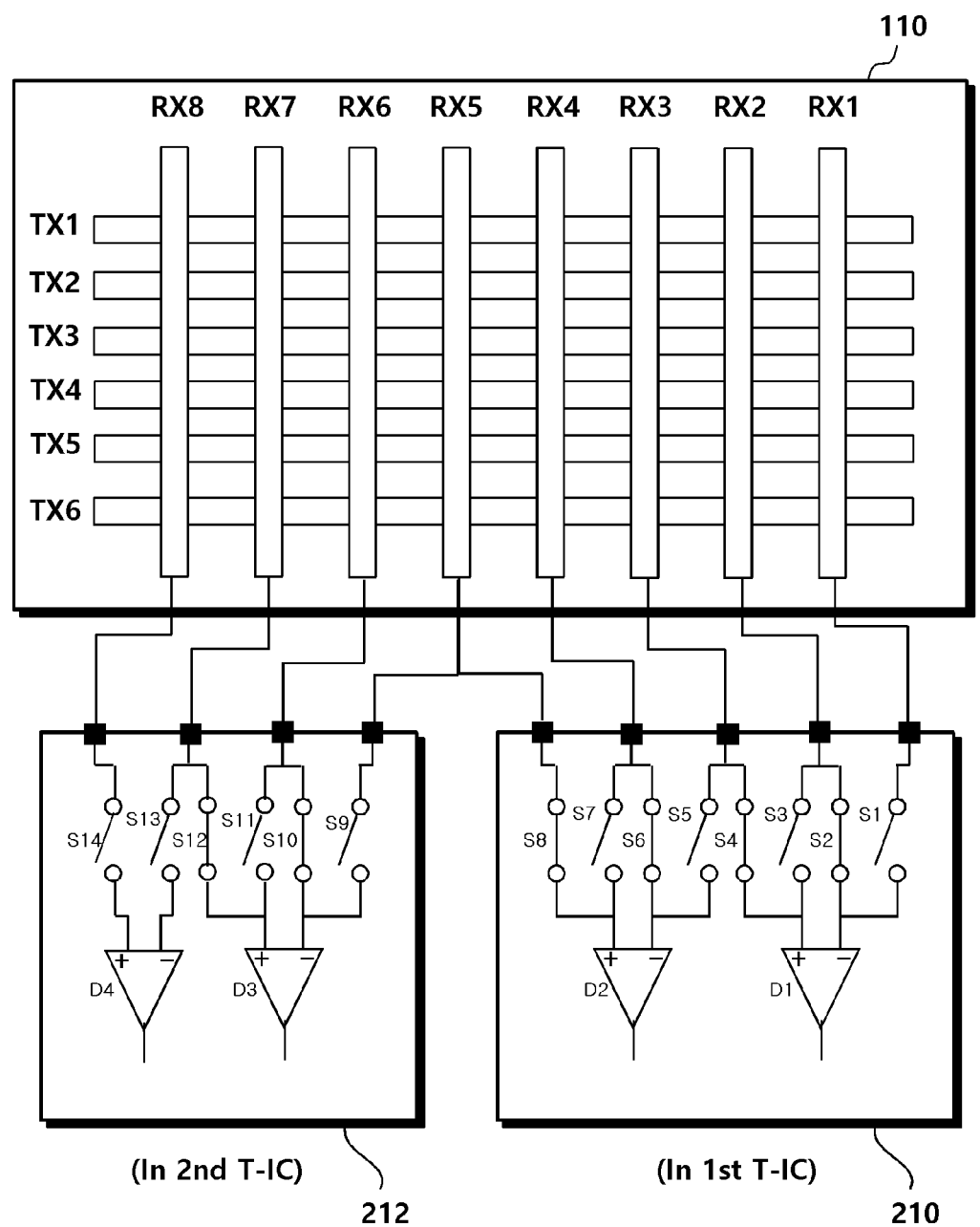
Figure 5:
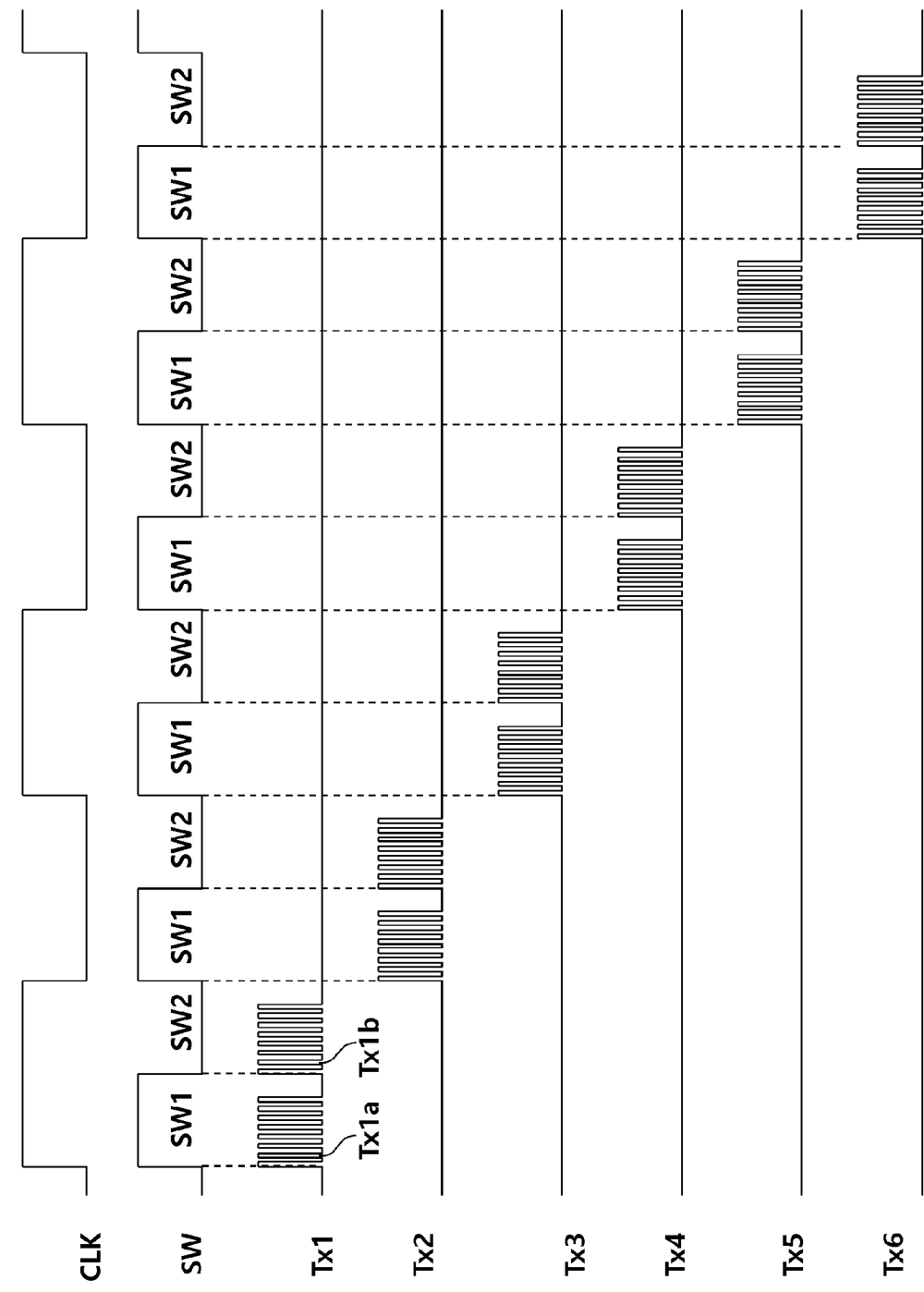
FIG. 5 is a timing diagram of synchronization signals and driving signals.

FIGS. 3 and 4 are views for describing a first example for the internal configuration of the sensing circuit unit of FIG. 2, and FIG. 5 is a timing diagram of synchronization signals and driving signals according to one embodiment.

Referring to FIG. 3, the first sensing circuit unit 210 of the first touch IC and the second sensing circuit unit 212 of the second touch IC may sense the sensors in a differential method using differential amplifiers D1 to D4. A method of generating the touch data using a sensing signal difference value of two sensors is referral to as the differential method. In order to generate the touch data in the differential method, two receiving electrodes should be connected to one differential amplifier as shown in FIG. 3. At this time, a pair of two adjacent receiving electrodes may be connected to one differential amplifier. When one receiving electrode is simultaneously connected to different differential amplifiers, since signal interference may be generated between the differential amplifiers, each of the receiving electrodes RX1 to RX8 may be connected to one differential amplifier.

Therefore, in FIG. 3, the first receiving electrode RX1 and the second receiving electrode RX2 are connected to the first differential amplifier D1. The third receiving electrode RX3 and the fourth receiving electrode RX4 are connected to the second differential amplifier D2. The fifth receiving electrode RX5 and the sixth receiving electrode RX6 are connected to the third differential amplifier D3. The seventh receiving electrode RX7 and the eighth receiving electrode RX8 are connected to the fourth differential amplifier D4.

In the differential method, all sensing signal difference values between two adjacent receiving electrodes should be received. Therefore, the receiving electrodes RX1 to RX8 are recombined in a type different from that shown in FIG. 3, and connected to the differential amplifiers D1 to D4. Referring to FIG. 4, as another type of the recombination, the second receiving electrode RX2 and the third receiving electrode RX3 are connected to the first differential amplifier D1, the fourth receiving electrode RX4, and the fifth receiving electrode RX5 are connected to the second differential amplifier D2, and the sixth receiving electrode RX6 and the seventh receiving electrode RX7 are connected to the third differential amplifier D3.

As described above, in the differential method, one receiving electrode may be connected to one differential amplifier during one time, and may be connected to another differential amplifier during another time. As described above, in the differential method, in order to connect one receiving electrode to different differential amplifiers during different times, the first sensing circuit unit 210 and the second sensing circuit unit 212 may include the differential amplifiers D1 to D3 to which four switches are connected or the differential amplifier D4 to which two switches are connected, as shown in FIGS. 3 and 4.

In the differential amplifiers D1 to D3 to which four switches are connected, two switches may be connected to plus terminals of the differential amplifiers D1 to D3, and the remaining two switches may be connected to minus terminals of the differential amplifiers D1 to D3. In addition, three adjacent receiving electrodes may be connected to the differential amplifiers D1 to D3 to which four switches are connected. At this time, one receiving electrode may be connected to a switch connected to the minus terminals of the differential amplifiers D1 to D3, and another receiving electrode may be connected to a switch connected to the plus terminals of the differential amplifiers D1 to D3. In addition, a remaining receiving electrode positioned between two receiving electrodes may be connected to another switch connected to the minus terminal, and may be further connected to another switch connected to the plus terminal. For example, the differential amplifier D1 is connected to four switches S1 to S4. The first switch S1 and the second switch S2 are connected to the minus terminal, and the third switch S3 and the fourth switch S4 are connected to the plus terminal of the differential amplifier D1. Also, the differential amplifier D1 may be connected to three adjacent receiving electrodes RX1 to RX3. The first receiving electrode RX1 is connected to the first switch S1 that is connected to the minus terminal of the differential amplifier D1, the third receiving electrode RX3 is connected to the fourth switch S4 that is connected to the plus terminal of the differential amplifier D1, and the second receiving electrode RX2 is connected to the second switch S2 that is connected to the minus terminal of the differential amplifier D1 and the third switch S3 that is connected to the plus terminal of the differential amplifier D1.

In the differential amplifier D4 to which two switches are connected, one switch S13 connected to the minus terminal of the differential amplifier D4 may be connected to one receiving electrode RX7, and another switch S14 connected to the plus terminal of the differential amplifier D4 may be connected to another receiving electrode RX8.

Referring to the timing diagrams of FIGS. 2 and 5, the second control unit 222 may generate the clock CLK in order to determine a driving signal period. The pulse generating unit 230 may generate the pulse for the driving signal according to the clock CLK. For example, the pulse generating unit 230 may generate the driving signal to the first driving electrode TX1 in synchronization with a rising edge of the clock CLK at a first time point, may generate the driving signal to the second driving electrode TX2 in synchronization with the following falling edge of the clock CLK, and may generate the driving signal to the third driving electrode TX3 in synchronization with the following rising edge of the clock CLK. According to such a method, the pulse generating unit 230 drives one driving electrode during a half period of the clock CLK.

The pulse generating unit 230 may generate the pulse by dividing a driving period for one driving electrode into two driving periods again. For example, the pulse generating unit 230 may divide the driving period for the first driving electrode TX1 into two driving periods, may generate a first driving pulse Tx1a in a first time period, and may generate a second driving pulse Tx1b in a second time period. In addition, the first control unit 220 and the second control unit 222 may connect the receiving electrodes RX1 to RX8 to the differential amplifiers D1 to D4 by controlling the switches as shown in FIG. 3 with respect to the first driving pulse Tx1a, and may connect the receiving electrodes RX1 to RX8 to the differential amplifiers D1 to D4 by controlling the switches as shown in FIG. 4 with respect to the second driving pulse Tx1b.

At this time, the switching signal unit 250 may transmit a switching control signal SW for a switching control of another touch IC 122 to another touch IC 122, in synchronization with the pulse output from the pulse generating unit 230 or the driving signal output from the driving circuit unit 240. For example, the switching signal unit 250 may generate the switching control signal SW of which a rising edge is synchronized at a start time point of the first driving pulse Tx1a and a falling edge is synchronized at a start time point of the second driving pulse Tx1b, and may transmit the switching control signal SW to another touch IC 122. In an embodiment of the present disclosure, the switching signal unit 250 is positioned in the second touch IC 124, and thus the switching signal unit 250 may transmit the switching control signal SW to the first touch IC 122.

Referring to FIG. 5, the switching signal unit 250 alternately generates a first switching control signal SW1 corresponding to the first driving pulse Tx1a and a second switching control signal SW2 corresponding to the second driving pulse Tx1b. The switching control signal SW is transferred to the first control unit 220 of the first touch IC 122. The first control unit 220 controls the switches S1 to S8, as shown in FIG. 3, in a period of the first switching control signal SW1, and controls the switches S1 to S8, as shown in FIG. 4, in a period of the second switching control signal SW2.

The second touch IC 124 also controls switches S9 to S14 as shown in FIG. 3 in the period of the first switching control signal SW1, and controls the switches S9 to S14, as shown in FIG. 4, in the period of the second switching control signal SW2, in synchronized with the switching control signal SW directly and indirectly. At this time, since the second touch IC 124 is a touch IC generating the switching control signal SW, although the second touch IC 124 does not identify the switching control signal SW, the second touch IC 124 may detect a state of the switching control signal SW. For example, since the second touch IC 124 includes the pulse generating unit 230, which is a source of the switching control signal SW, the second touch IC 124 may directly and indirectly detect the state of the switching control signal SW through a signal of the pulse generating unit 230. In addition, since the signal of the pulse generating unit 230 is generated from the clock CLK of the second control unit 222, the second control unit 222 may autonomously detect the state of the switching control signal without a detection of another signal. The second control unit 222 may control the on and off states of the switches S9 to S14 that are positioned in the second touch IC 124 using the detected switching control signal SW.

Meanwhile, referring to FIGS. 3 and 4 again, an odd number of receiving electrodes are connected to the first sensing circuit unit 210 of the first touch IC, and an even number of receiving electrodes are connected to the second sensing circuit unit 212 of the second touch IC. A difference generated in a circuit configuration and a control of each touch IC according to the number of the connected receiving electrodes is described in more detail.

The number of receiving electrodes positioned in the touch panel 110 may be an even number. When the number of the receiving electrodes positioned in the touch panel 110 is the even number as described above, an even number of receiving electrodes are connected to at least one touch IC in the differential method. For example, as the embodiment of FIGS. 3 and 4, in a case wherein the number of the receiving electrodes RX1 to RX8 is eight, when five receiving electrodes RX1 to RX5 are connected to the first sensing circuit unit 210 of the first touch IC, four receiving electrodes RX5 to RX8 are connected to the second sensing circuit unit 212 of the second touch IC.

Even in a case in which the number of the touch ICs forming the touch system 120 is three or more, an even number of receiving electrodes are connected to one touch IC. For example, when the total number of the receiving electrodes is 12, in order to connect three touch ICs in the differential method, the touch ICs should be connected to five receiving electrodes, five receiving electrodes and four receiving electrodes, respectively.

When odd number of receiving electrodes are connected to the touch IC, the receiving electrodes may be sensed using the differential amplifiers D1 and D2 connected to four switches, as in the first sensing circuit unit 210 of the first touch IC of FIGS. 3 and 4. However, when even number of receiving electrodes are connected to the touch IC, at least one differential amplifier D4 may be connected to two switches and the remaining differential amplifier D3 may be connected to four switches, as in the second sensing circuit unit 212 of the second touch IC of FIGS. 3 and 4.

In respect of a control, the differential amplifier to which four switches are connected and the differential amplifier to which two switches are connected may be differently controlled. Such a difference of the control is described with reference to FIGS. 3 and 4 again.

For the convenience of description, the fifth receiving electrode RX5 positioned in a boundary of the first area and the second area is referred to as a boundary receiving electrode, the receiving electrodes connected to the first touch IC 122 except for the boundary receiving electrode are referred to as first receiving electrodes RX1 to RX4, and the receiving electrodes connected to the second touch IC 124 except for the boundary receiving electrode are referred to as second receiving electrodes RX6 to RX8.

Referring to FIGS. 3 and 5, the first touch IC 122 releases the connection with the boundary receiving electrode RX5 in a first time period corresponding to the first switching control signal SW1, and receives the sensing signal from the first receiving electrodes RX1 to RX4. To this end, the first control unit 220 closes odd-numbered switches S1, S3, S5 and S7, and opens even-numbered switches S2, S4, S6 and S8.

The boundary receiving electrode RX5 is connected to the second touch IC 124 in the first time period. At this time, the second touch IC 124 receives the sensing signal from the boundary receiving electrode RX5 and the second receiving electrodes RX6 to RX8. To this end, the second control unit 222 closes a ninth switch S9, an eleventh switch S11, a thirteenth switch S13 and a fourteenth switch S14, and opens a tenth switch S10 and a twelfth switch S12. That is, the second control unit 222 closes the odd-numbered switches S9 and S11 and opens the even-numbered switches S10 and S12 with respect to the differential amplifier D3 to which the four switches are connected in the first time period. However, the second control unit 222 closes both of two switches S13 and S14 with respect to the differential amplifier D4 to which two switches are connected.

Referring to FIGS. 4 and 5, the first touch IC 122 is connected to the boundary receiving electrode RX5 and receives the sensing signal from the boundary receiving electrode RX5 in a second time period corresponding to the second switching control signal SW2. In addition, the first touch IC 122 releases the connection with the first receiving electrode RX1 positioned in an outermost in a direction opposite to that of the boundary receiving electrode RX5, among the first receiving electrodes RX1 to RX4, and receives the sensing signal from remaining receiving electrodes RX2 to RX4. To this end, the first control unit 220 closes even-numbered switches S2, S4, S6 and S8, and opens odd-numbered switches S1, S3, S5 and S7.

As a result, the first touch IC 122 to which an odd number of receiving electrodes RX1 to RX5 are connected synchronize the odd-numbered switches S1, S3, S5 and S7 and the even-numbered switches S2, S4, S6 and S8 in different time periods, to perform on and off controls.

Meanwhile, the second touch IC 124 releases the connection with the boundary receiving electrode in the second time period, releases the connection with the eighth receiving electrode RX8 positioned in the outermost in a direction opposite to that of the boundary receiving electrode RX5, among the second receiving electrodes RX6 to RX8, and receives the sensing signal from remaining receiving electrodes RX6 and RX7. To this end, the second control unit 222 closes even-numbered switches S10 and S12 and opens odd-numbered switches S9 and S11 in the second time period with respect to the differential amplifier D3 to which four switches are connected. However, the second control unit 222 opens both of the switches S13 and S14 with respect to the differential amplifier D4 to which two switches are connected.

As a result, with respect to the differential amplifiers D1 to D3 to which four switches are connected, the switches connected to each differential amplifier may be divided into odd-numbered switches and even-numbered switches, and may be controlled to be turned on and off by synchronizing the odd-numbered switches and even-numbered switches in each time period. However, with respect to the differential amplifier D4 to which two switches are connected, two switches should be controlled to be turned on and off by synchronizing two switches in each time period.

Meanwhile, the number of the differential amplifiers positioned each touch IC may be determined according to the number of the remaining receiving electrodes except for the boundary receiving electrode RX5. For example, when the number of the first receiving electrodes connected to the first touch IC 122 is N (N is a natural number), ⌈N/2⌉ differential amplifier may be positioned in the first touch IC 122. When the number of the second receiving electrodes connected to the second touch IC 124 is M (M is a natural number), ⌈M/2⌉ differential amplifier may be positioned in the second touch IC 124. Here, ⌈A⌉ means a minimum integer not smaller than A.

At this time, M is an odd number, as described above, one of the differential amplifiers positioned in the second touch IC 124 may be connected to two switches, and each remaining differential amplifier may be connected to four switches. In addition, if one of the differential amplifiers is connected to two switches, when the first touch IC 122 receives the sensing signal from the boundary receiving electrode, both of two switches may be opened, and when the second touch IC 124 receives the sensing signal from the boundary receiving electrode, both of the two switches may be closed.

When N is an odd number and M is an odd number, the first touch IC 122 may include the differential amplifier to which two switches are connected, and the first touch IC 122 may be operated as a mechanism that is equal to that of the second touch IC 124. For example, in this case, when the first touch IC 122 receives the sensing signal from the boundary receiving electrode, the second touch IC 124 releases the connection with at least one receiving electrode among the second receiving electrodes and the boundary receiving electrode. When the second touch IC 124 receives the sensing signal from the boundary receiving electrode, the first touch IC 122 also releases the connection with at least one receiving electrode among the first receiving electrodes and the boundary receiving electrode.

In the first example described with reference to FIGS. 3 and 4, the differential amplifier D4 to which two switches are connected is positioned in the outermost in the direction opposite to the direction of the boundary receiving electrode RX5, but the differential amplifier D4 may be positioned in another position.

Figure 6:
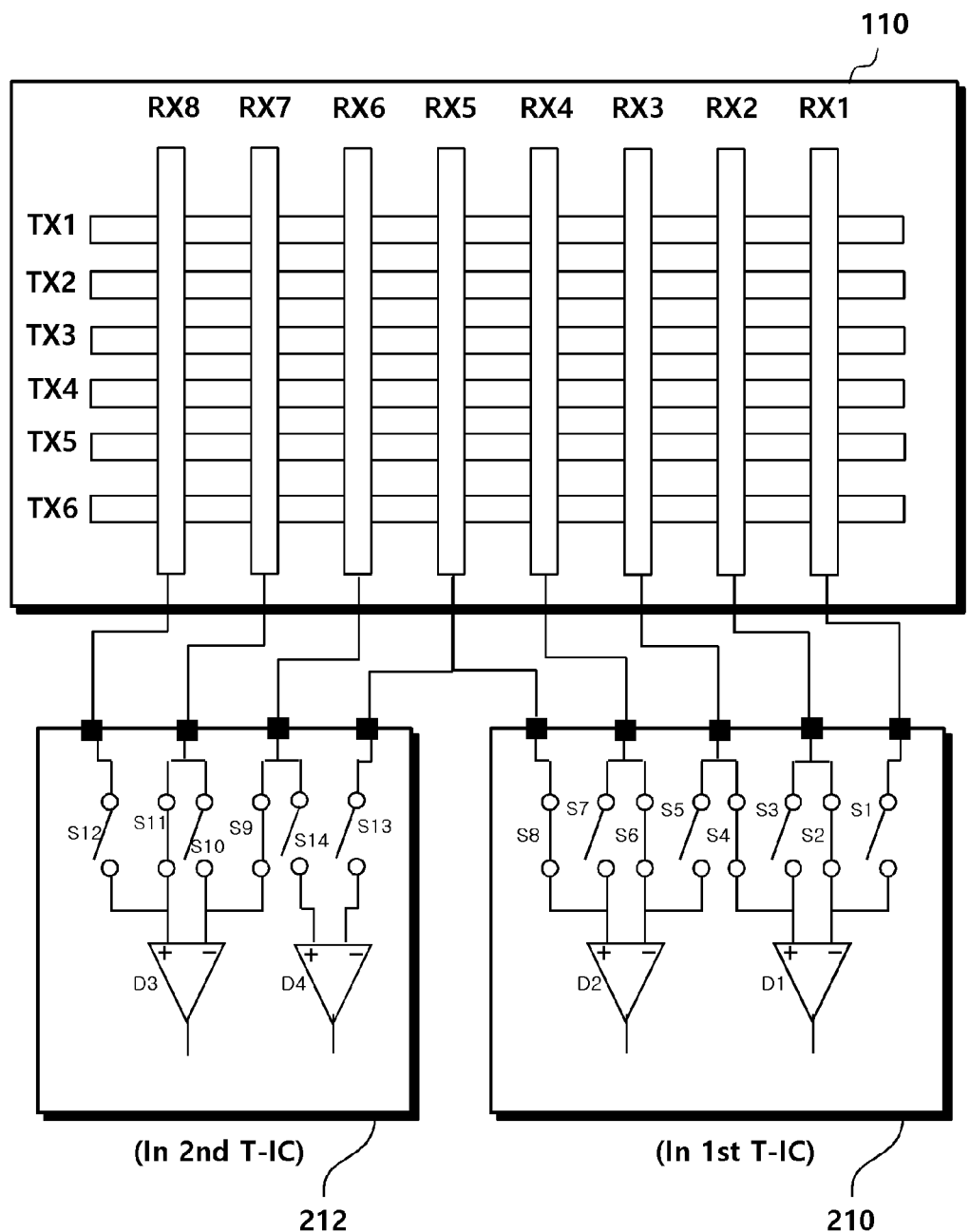
FIG. 6 is a view for describing a second example for the internal configuration of the sensing circuit unit of FIG. 2 according to an embodiment of the present disclosure.

FIG. 6 is a view for describing a second example for the internal configuration of the sensing circuit unit of FIG. 2 according to one embodiment.

Referring to FIG. 6, in the second sensing circuit unit 212 of the second touch IC, the fourth differential amplifier D4 connected to two switches S13 and S14 is positioned in a direction that is equal to that of the boundary receiving electrode, and the third differential amplifier D3 connected to fourth switches S9 to S12 is positioned in a direction that is opposite to that of the boundary receiving electrode.

In such a configuration, operation methods of the switches S1 to S14 are described. First, when a time period when the boundary receiving electrode RX5 is connected to the second touch IC 124 is a first time period, and a time period when the boundary receiving electrode RX5 is connected to the first touch IC 122 is a second time period, the on and off of the switches S1 to S8 positioned in the first touch IC 122 in the first time period and the second time period are controlled as the description with reference to FIGS. 3, 4 and 5.

For example, the first touch IC 122 releases the connection with the boundary receiving electrode RX5 in the first time period corresponding to the first switching control signal SW1, and receives the sensing signal from the first receiving electrodes RX1 to RX4. To this end, the first control unit 220 closes the odd-numbered switches S1, S3, S5 and S7, and opens the even-numbered switches S2, S4, S6 and S8. In addition, the first touch IC 122 is connected to the boundary receiving electrode RX5 and receives the sensing signal from the boundary receiving electrode RX5 in the second time period corresponding to the second switching control signal SW2. In addition, the first touch IC 122 releases the connection with the first receiving electrode RX1 positioned at an outermost portion in a direction opposite to that of the boundary receiving electrode RX5, among the first receiving electrodes RX1 to RX4, and receives the sensing signal from remaining receiving electrodes RX2 to RX4. To this end, the first control unit 220 closes the even-numbered switches S2, S4, S6 and S8, and opens odd-numbered switches S1, S3, S5 and S7.

In contrast, the on and off of the switches S9 to S14 positioned in the second touch IC 124 are controlled differently from the description with reference to FIGS. 3 and 4.

For example, the boundary receiving electrode RX5 is connected to the second touch IC 124 in the first time period. At this time, the second touch IC 124 receives the sensing signal from the boundary receiving electrode RX5 and the second receiving electrodes RX6 to RX8. To this end, the second control unit 222 closes the tenth switch S10, the twelfth switch S12, the thirteenth switch S13, and the fourteenth switch S14, and opens the ninth switch S9 and the eleventh switch S11. That is, the second control unit 222 closes the even-numbered switches S10 and S12 and opens the odd-numbered switches S9 and S11 with respect to the differential amplifier D3 to which the four switches are connected in the first time period. However, the second control unit 222 closes both switches S13 and S14 with respect to the differential amplifier D4 to which the two switches are connected. In addition, the second touch IC 124 releases the connection with the boundary receiving electrode RX5, releases the connection with the eighth receiving electrode RX8 positioned in the outermost portion in the direction opposite to that of the boundary receiving electrode RX5 among the second receiving electrodes RX6 to RX8, and receives the sensing signal from the remaining receiving electrodes RX6 and RX7. To this end, the second control unit 222 closes the odd-numbered switches S9 and S11 and opens the even-numbered switches S10 and S12 with respect to the differential amplifier D3 to which four switches are connected in the second time period. However, the second control unit 222 opens both of two switches S13 and S14 with respect to the differential amplifier D4 to which two switches are connected.

Meanwhile, in the first example and the second example of the sensing circuit unit described with reference to FIGS. 3, 4 and 6, the circuit configurations of the sensing circuit units of two touch ICs 122 and 124 are different. However, for the ease of design or compatibility between the touch ICs, the circuit configurations of the sensing circuit units of two touch ICs 122 and 124 may be the same.

Figure 7:
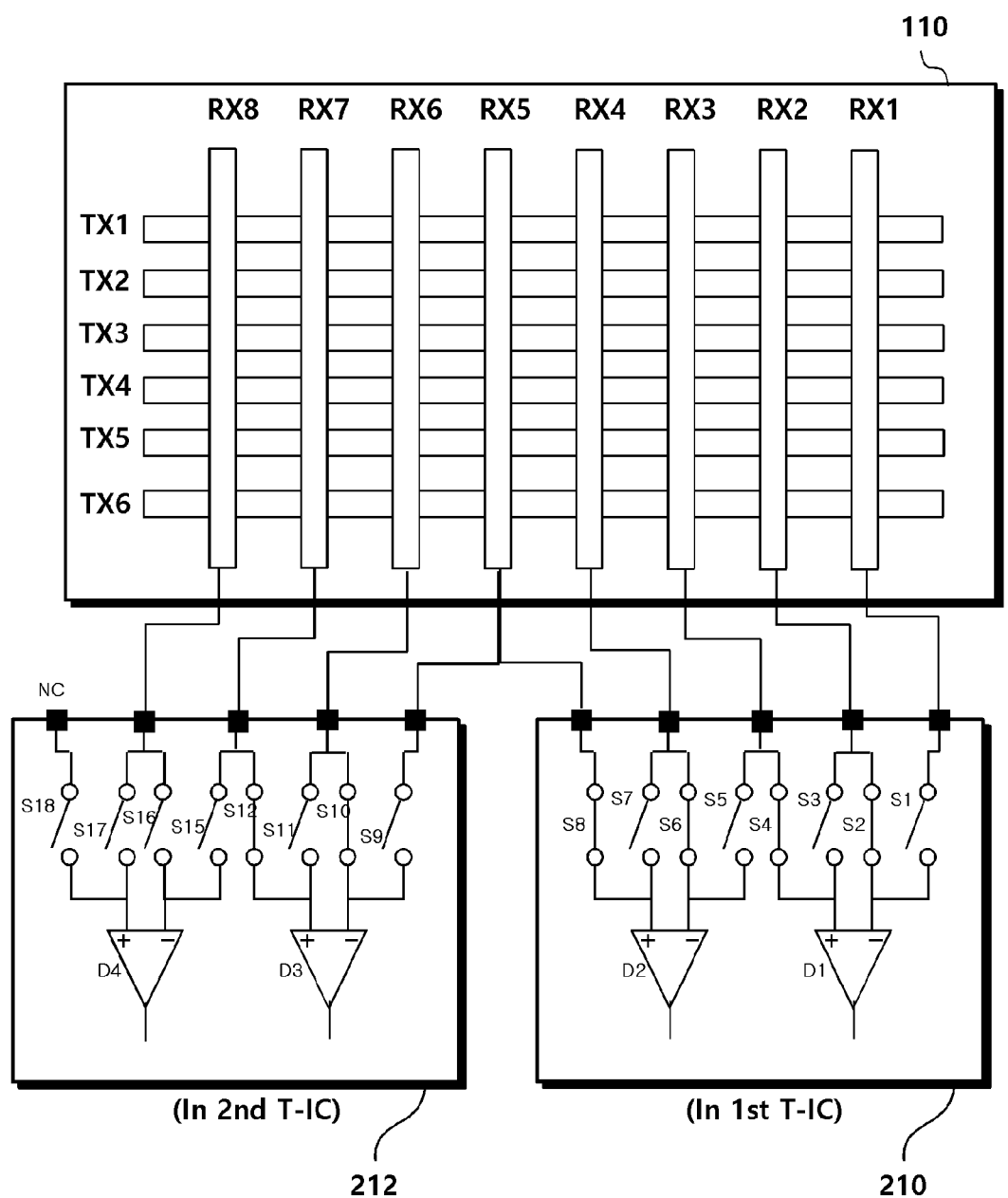
FIG. 7 is a view for describing a third example for the internal configuration of the sensing circuit unit of FIG. 2 according to an embodiment of the present disclosure.

FIG. 7 is a view for describing a third example for the internal configuration of the sensing circuit unit of FIG. 2 according to one embodiment.

Referring to FIG. 7, both of the first sensing circuit unit 210 of the first touch IC and the second sensing circuit unit 212 of the second touch IC include the differential amplifiers D1 to D4 to which four switches are connected.

Meanwhile, in such a configuration, since the number of the receiving electrodes connected to the second touch IC is smaller than the number of the receiving electrodes connected to the first touch IC (e.g., by 1), the receiving electrode is not connected to one pin (hereinafter, 'NC pin') of the second sensing circuit unit 212 of the second touch IC.

In such a configuration, the first touch IC 122 may control to turn on and off the switches S1 to S8 in a method that is the same as that of the first example and the second example.

In contrast, the second touch IC 124 may control the switches S9 to S12 and S15 to S18 somewhat differently from the first example and the second example.

First, in the first time period when the second touch IC 124 is connected to the boundary receiving electrode RX5, the second touch IC 124 closes the odd-numbered switches S9 and S11 and opens the even-numbered switches S10 and S12 among the switches S9 to S12 connected to the third differential amplifier D3. In addition, in the first time period, the second touch IC 124 closes the odd-numbered switches S15 and S17 and opens the even-numbered switches S16 and S18 among the switches S15 to S18 connected to the fourth differential amplifier D4. That is, the second touch IC 124 closes the odd-numbered switches S9, S11, S15, and S17 and opens the even-numbered switches S10, S12, S16, and S18 in the first time period with respect to all differential amplifiers D3 and D4.

In the second time period when the second touch IC 124 releases the connection with the boundary receiving electrode RX5, the second touch IC 124 closes the even-numbered switches S10 and S12 and opens the odd-numbered switches S9 and S11 among the switches S9 to S12 connected to the third differential amplifier D3. In addition, the second touch IC 124 opens all switches S15 to S18 connected to the fourth differential amplifier D4 in the second time period. That is, in the second time period, the second touch IC 124 opens all switches S15 to S18 with respect to the differential amplifier D4 connected to the NC pin, and closes the even-numbered switches S10 and S12 and opens the odd-numbered switches S9 and S11 with respect to the differential amplifier D3 to which the NC pin is not connected.

In another point of view, in the differential amplifier D4 to which the NC pin is connected in the second touch IC 124, two switches S16 and S18 are always opened, and the remaining two switches S15 and S17 are controlled to be turned on and off according to the time period.

In the above, embodiments in which two touch ICs are used in the touch system 120 are mainly described, but two or more touch ICs may be used in the touch system 120. Even in a case in which two or more touch ICs are used, the embodiments described above may be employed. For example, when a first touch IC, a second touch IC, and a third touch IC are employed in the touch system 120, the embodiments described above may be applied to a relation between the first touch IC and the second touch IC, and may be applied to a relation between the second touch IC and the third touch IC.

In the above, an embodiment in which five receiving electrodes RX1 to RX5 are connected to the first touch IC 122 and four receiving electrodes RX5 to RX8 are connected to the second touch IC 124 is described. However, more receiving electrodes may be connected to each of the touch ICs 122 and 124. For example, 401 receiving electrodes may be connected to the first touch IC 122 and 400 receiving electrodes may be connected to the second touch IC 124. At this time, the boundary receiving electrode may be understood as the receiving electrode together connected to the first touch IC 122 and the second touch IC 124, that is, the receiving electrode sharing the first touch IC 122 and the second touch IC 124.

As described above, in a multi-chip system sensing the touch of the touch panel 110 using two or more touch ICs, an even number of receiving electrodes may be connected to one touch IC. Specifically, when the multi-chip touch system senses the touch in a differential method, a control for connecting the receiving electrodes to the differential amplifier becomes an important issue. In the embodiment described above, for such a control, a control technology wherein the second touch IC releases the connection with at least one receiving electrode and the boundary receiving electrode when the second touch IC connected to even number of receiving electrodes is not connected to the boundary receiving electrode, that is, when the first touch IC receives the sensing signal from the boundary receiving electrode, is provided.

When the first touch IC and the second touch IC simultaneously sense the boundary receiving electrode, a distortion may be generated in the sensing signal by a mutual interference. However, according to the control technology proposed in the above-mentioned description, such interference may be removed.

In addition, when the receiving electrode is connected to a differential amplifier that should not receive the sensing signal, a problem may be generated in which noise may flow through a corresponding differential amplifier or damage may be generated through the corresponding differential amplifier. However, according to the control technology proposed in the above-mentioned description, such a problem may be removed.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A touch system for sensing proximity or a touch of an object for a touch panel in which a plurality of areas is divided, the touch system comprising:
    a first touch IC configured to generate touch data for a first area from a sensing signal received from first receiving electrodes and a boundary receiving electrode; and
    a second touch IC configured to generate touch data for a second area from a sensing signal received from second receiving electrodes and the boundary receiving electrode,
    wherein, when the first touch IC receives the sensing signal from the boundary receiving electrode, the second touch IC releases the connection with at least one receiving electrode among the second receiving electrodes and releases the connection with the boundary receiving electrode.

2. The touch system of claim 1, wherein sensors are formed by intersections of a plurality of driving electrodes and a plurality of receiving electrodes,
    the second touch IC is configured to provide a driving signal to the driving electrodes, and
    the first touch IC is configured to receive the sensing signal from the first receiving electrodes and the boundary receiving electrode according to a synchronization signal received from the second touch IC.

3. The touch system of claim 2, wherein the second touch IC is configured to provide a first driving signal to each driving electrode during a first time period, and is configured to provide a second driving signal to each driving electrode during a second time period,
    the first touch IC is configured to release the connection with the boundary receiving electrode during the first time period, and is configured to receive the sensing signal from the boundary receiving electrode during the second time period, and
    the second touch IC is configured to receive the sensing signal from at least one receiving electrode among the second receiving electrodes and the boundary receiving electrode during the first time period, and is configured to releases the connection with the receiving electrode and the boundary receiving electrode during the second time period.

4. The touch system of claim 1, wherein a number of first receiving electrodes is N (N is a natural number), a number of the second receiving electrodes is M (M is an odd number),
    $\lceil N/2 \rceil$ differential amplifiers are positioned in the first touch IC, $\lceil M/2 \rceil$ differential amplifiers are positioned in the second touch IC-$\lceil A \rceil$ is a minimum integer not smaller than A.

5. The touch system of claim 4, wherein a first differential amplifier among the differential amplifiers positioned in the second touch IC is connected to two switches, and the remaining each differential amplifier is connected to four switches.

6. The touch system of claim 5, wherein, when the first touch IC receives the sensing signal from the boundary receiving electrode, both of two switches connected to the first differential amplifier are opened.

7. The touch system of claim 5, wherein, when the second touch IC receives the sensing signal from the boundary receiving electrode, both of two switches connected to the first differential amplifier are closed.

8. The touch system of claim 1, wherein the number of the first receiving electrodes is N (N is an odd number), the number of the second receiving electrodes is M (M is an odd number), and
    when the second touch IC receives the sensing signal from the boundary receiving electrode, the first touch IC releases the connection with at least one receiving electrode among the first receiving electrodes and releases the connection with the boundary receiving electrode.

9. The touch system of claim 1, wherein the touch panel includes even numbers of receiving electrodes,
    the first touch IC and the second touch IC share the boundary receiving electrode,
    the first touch IC is connected to odd numbers of receiving electrodes, and the second touch IC is connected to even numbers of receiving electrodes.

10. The touch system of claim 1, wherein the second touch IC is configured to receive the touch data for the first area from the first touch IC, and is configured to transmit the touch data for the first area to a host by combining the touch data for the first area with the touch data for the second area, and
    the first touch IC is configured to receive the touch data for the second area from the second touch IC, and is configured to transmit the touch data for the second area to the host by combining the touch data for the second area with the touch data for the first area.

11. The touch system of claim 1, wherein each first touch IC and second touch IC includes a plurality of differential amplifiers,
    a first differential amplifier among the plurality of amplifiers included in the second touch IC is connected to two switches, a second differential amplifier among the plurality of amplifiers included in the second touch IC is connected to four switches, the two switches are connected to two receiving electrodes, and the four switches are connected to three receiving electrodes.

12. The touch system of claim 11, wherein the second touch IC further includes a switching signal unit configured to generate a switching control signal for switches,
    the switching control signal is transmitted to the first touch IC, and the switches included in the first touch IC is controlled according to the switching control signal.

13. The touch system of claim 1, wherein the number of second receiving electrodes is M (M is an odd number),
the second touch IC includes a plurality of differential amplifiers, each differential amplifier is connected to four switches, and the receiving electrode is not connected to one switch among four switches connected to a first differential amplifier.

14. The touch system of claim 13, wherein two switches including the one switch among four switches connected to the first differential amplifier are always opened.

15. The touch system of claim 1, wherein sensors are formed by intersections of a plurality of driving electrodes and a plurality of receiving electrodes,
the second touch IC is configured to provide a driving signal to the driving electrodes, and the second touch IC is configured to simultaneously provide different types of driving signals to two or more driving electrodes.

* * * * *

UNITED STATES PATENT AND TRADEMARK OFFICE
CERTIFICATE OF CORRECTION

PATENT NO. : 9,916,055 B2
APPLICATION NO. : 15/096858
DATED : April 12, 2016
INVENTOR(S) : Yong Sung Ahn and Jung Min Choi It is certified that error appears in the above-identified patent and that said Letters Patent is hereby corrected as shown below:

In the Claims

In Claim 3, Column 16, Line 1: "to releases the connection with" should read -- to release the connection --

In Claim 12, Column 17, Line 1: "touch IC is controlled" should read as -- touch IC are controlled --

Signed and Sealed this
Twenty-fourth Day of July, 2018

Andrei Iancu
*Director of the United States Patent and Trademark Office*